US008734876B2

(12) United States Patent
French

(10) Patent No.: US 8,734,876 B2
(45) Date of Patent: May 27, 2014

(54) CONFECTIONARY PRODUCT AND METHOD OF MANUFACTURE AND USE

(76) Inventor: David A. French, Carlsbad, CA (US)

( * ) Notice: Subject to any disclaimer, the term of this patent is extended or adjusted under 35 U.S.C. 154(b) by 266 days.

(21) Appl. No.: 12/974,531

(22) Filed: Dec. 21, 2010

(65) Prior Publication Data

US 2011/0159155 A1 Jun. 30, 2011

Related U.S. Application Data

(60) Provisional application No. 61/290,634, filed on Dec. 29, 2009.

(51) Int. Cl.
*A23G 3/56* (2006.01)
*A23G 3/50* (2006.01)
*A47G 21/18* (2006.01)

(52) U.S. Cl.
USPC ............................ 426/134; 426/104; 426/115

(58) Field of Classification Search
USPC ............ 426/91, 122, 110, 134, 104, 115, 85, 426/394, 112, 89, 90, 100, 101, 103, 135, 426/138, 139, 143, 279, 280, 282, 284; 222/575, 92, 251, 492, 95, 107, 213, 222/214, 215; 446/386, 475, 71–81; 239/16, 17, 24, 33, 601, 602
See application file for complete search history.

(56) References Cited

U.S. PATENT DOCUMENTS

| | | | | |
|---|---|---|---|---|
| 1,933,596 A | * | 11/1933 | MacLean | 426/115 |
| 2,121,185 A | * | 6/1938 | Claff | 426/104 |
| 2,867,536 A | * | 1/1959 | Mead et al. | 426/85 |
| 3,521,795 A | * | 7/1970 | Bergishagen et al. | 222/386 |
| 3,911,155 A | | 10/1975 | Ferrero | |
| 4,229,482 A | * | 10/1980 | Kreske, Jr. | 426/134 |
| 4,569,848 A | | 2/1986 | Giorgetti et al. | |
| 4,910,030 A | | 3/1990 | Trojahn | |
| 5,066,502 A | * | 11/1991 | Eales | 426/75 |
| 5,152,742 A | | 10/1992 | Simpson | |
| 5,263,255 A | | 11/1993 | Watson | |
| 5,324,527 A | * | 6/1994 | Coleman | 426/134 |
| 5,445,462 A | | 8/1995 | Johnson et al. | |
| 5,450,706 A | * | 9/1995 | Latini | 53/397 |
| 5,637,344 A | * | 6/1997 | Carpenter et al. | 426/631 |
| 5,676,990 A | | 10/1997 | Wawrzynski | |

(Continued)

OTHER PUBLICATIONS

Notification, International Search Report and Written Opinion dated Sep. 29, 2011 for PCT/US2010/061458.

*Primary Examiner* — Viren Thakur
*Assistant Examiner* — Sophia Leung
(74) *Attorney, Agent, or Firm* — Procopio Cory Hargreaves & Savitch LLP

(57) ABSTRACT

A confectionary product has a hollow, pliable tube containing a flowable confectionary material and an enlarged head secured to one end of the tube, the opposite end of the tube being sealed. The head has one or more dispensing openings on its outer surface. In one case, the head is solid and a passageway extends through the head from an inlet end communicating with the tube at one end and at least one dispensing opening at the other end. In another case, the head is hollow and has a plurality of openings. The wall of the tube can be squeezed to force the flowable confection through the head and out through the opening or openings for consumption. In one embodiment, the head is of edible material such as hard candy and is consumed after substantially all of the confectionary material is squeezed out of the tube and consumed.

7 Claims, 14 Drawing Sheets

(56) References Cited

U.S. PATENT DOCUMENTS

| | | | |
|---|---|---|---|
| 5,895,673 | A | 4/1999 | Keough et al. |
| 5,993,870 | A | 11/1999 | Hoeting et al. |
| 6,221,407 | B1 | 4/2001 | Gallart et al. |
| 6,241,412 | B1 | 6/2001 | Spies et al. |
| 6,595,940 | B1 | 7/2003 | D'Alessio et al. |
| 6,730,339 | B2 * | 5/2004 | Chan .................. 426/104 |
| 6,884,447 | B2 | 4/2005 | Baker |
| 6,974,090 | B2 * | 12/2005 | Brax .................. 239/107 |
| 7,341,452 | B2 | 3/2008 | Dragan et al. |
| 7,396,461 | B2 | 7/2008 | Bommi et al. |
| 2002/0129500 | A1 | 9/2002 | Chiu |
| 2003/0044482 | A1 * | 3/2003 | Stachowicz et al. .......... 425/208 |
| 2003/0082279 | A1 | 5/2003 | Chan |
| 2003/0228828 | A1 | 12/2003 | Coleman et al. |
| 2006/0192025 | A1 * | 8/2006 | White et al. .................. 239/33 |
| 2007/0186951 | A1 | 8/2007 | Gueret |
| 2008/0038414 | A1 * | 2/2008 | Membrado et al. .......... 426/115 |
| 2008/0102172 | A1 * | 5/2008 | Capelle et al. ................ 426/103 |
| 2008/0131190 | A1 | 6/2008 | Goodman et al. |
| 2008/0197141 | A1 * | 8/2008 | Felfoldi .................. 220/705 |
| 2008/0229585 | A1 | 9/2008 | Kelly |
| 2011/0049170 | A1 * | 3/2011 | Wheeler .................. 220/708 |

\* cited by examiner

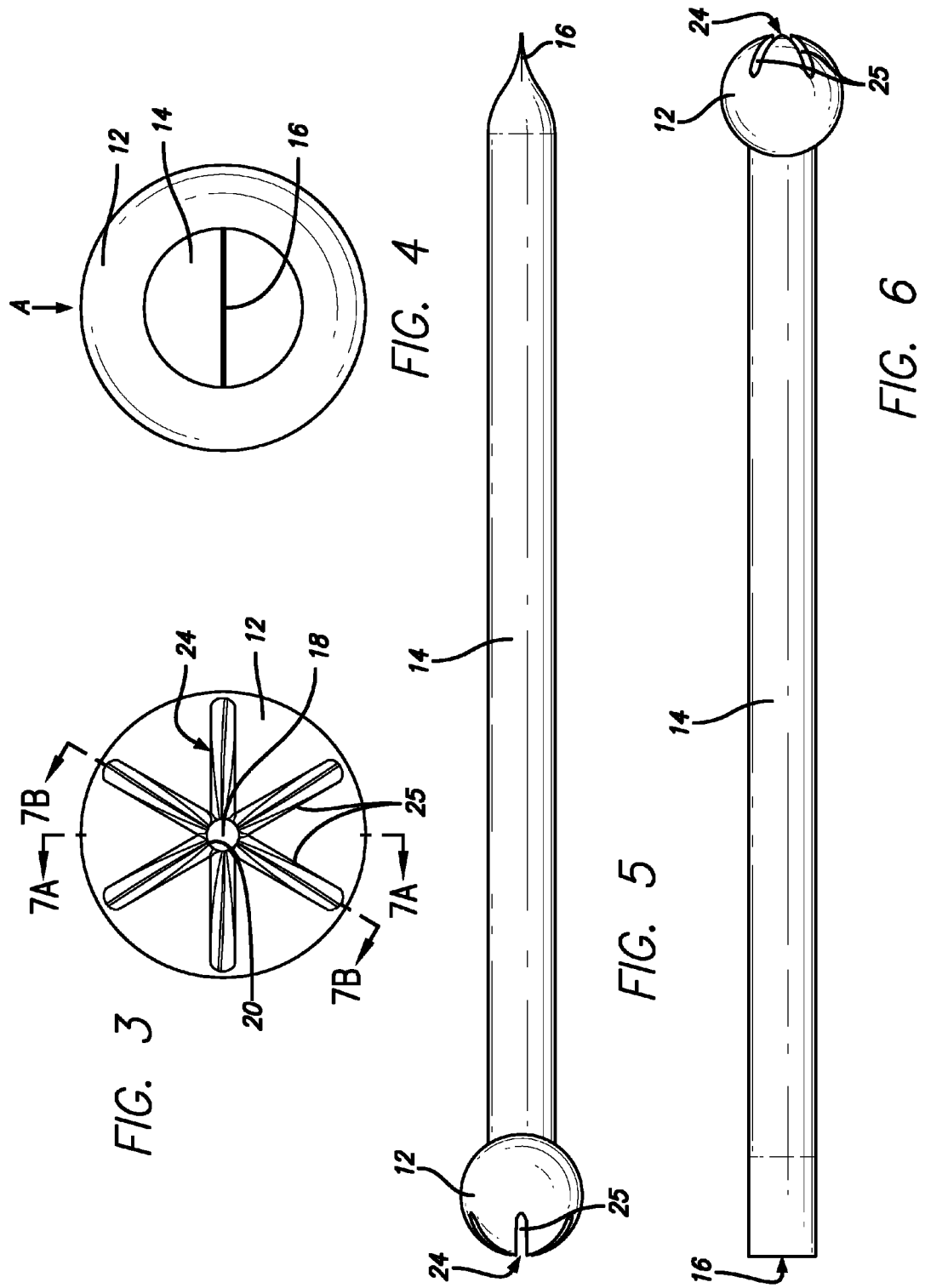

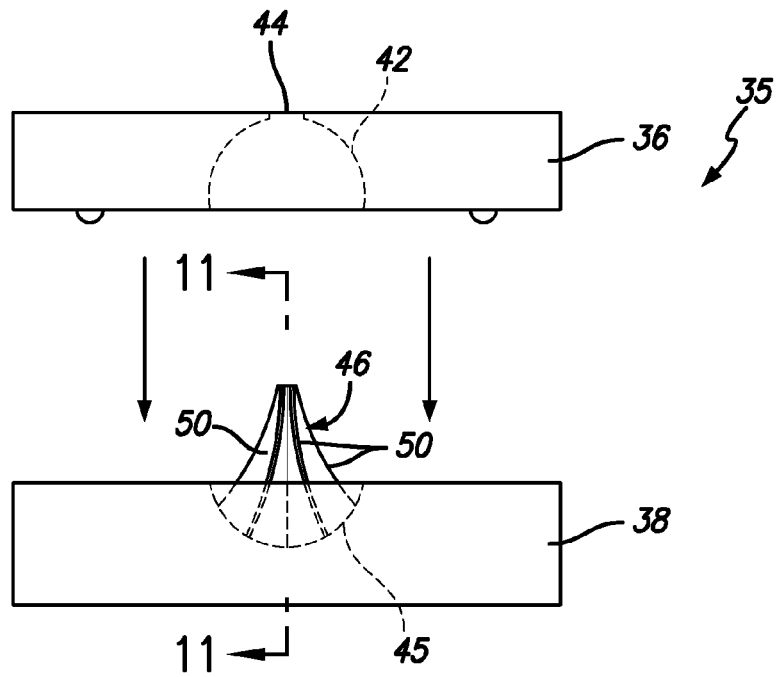
FIG. 10
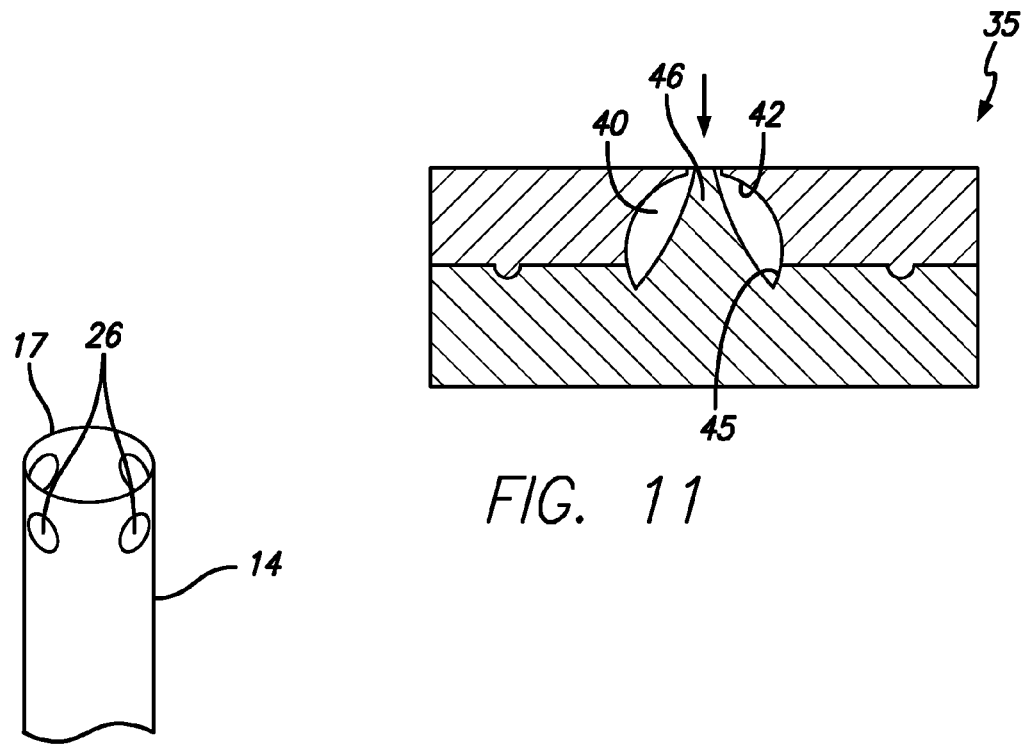
FIG. 11
FIG. 12

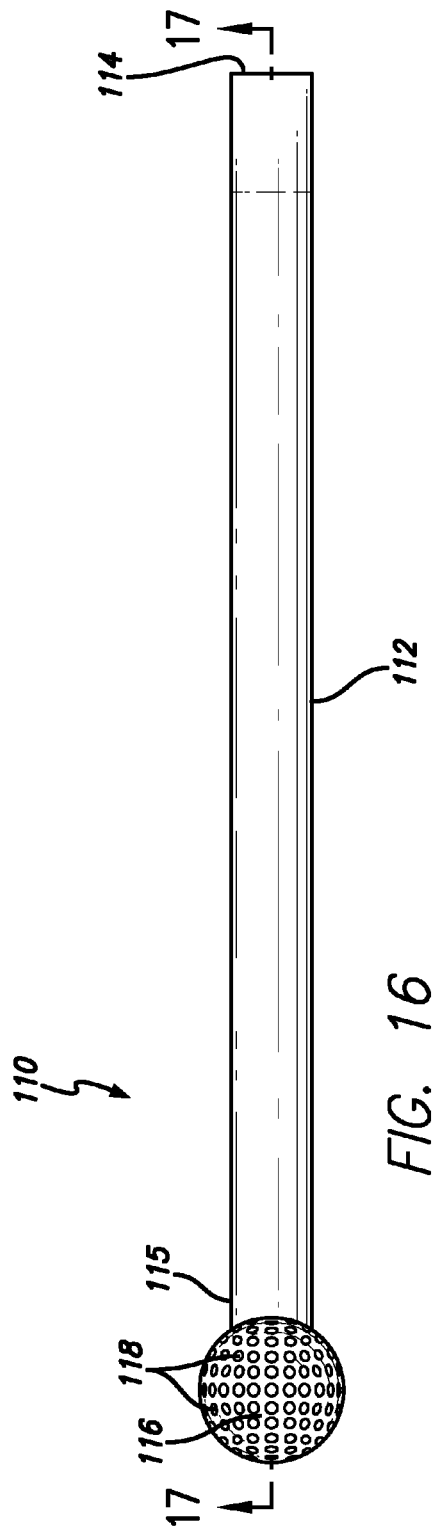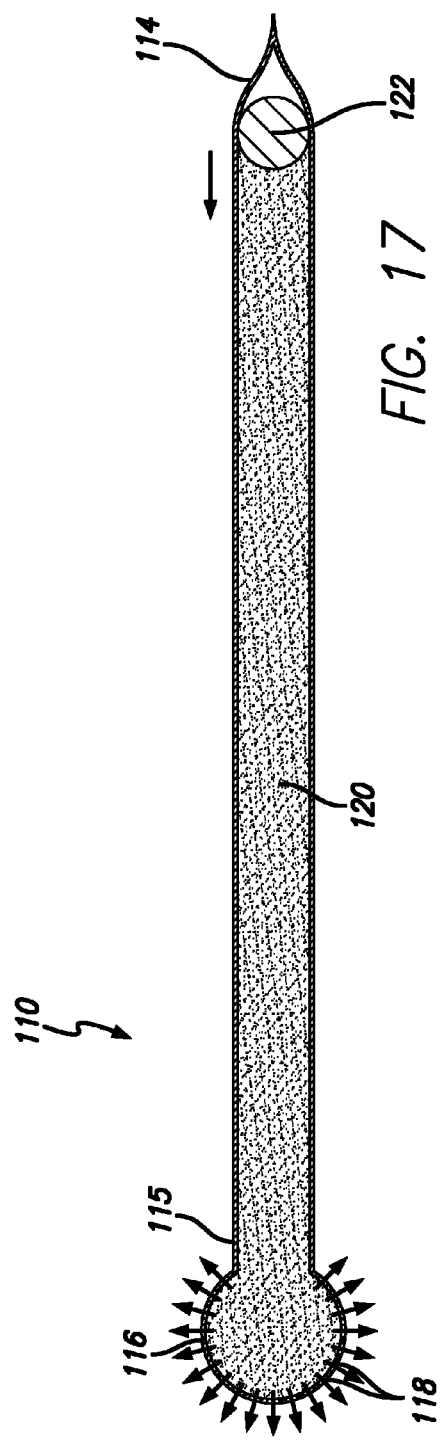

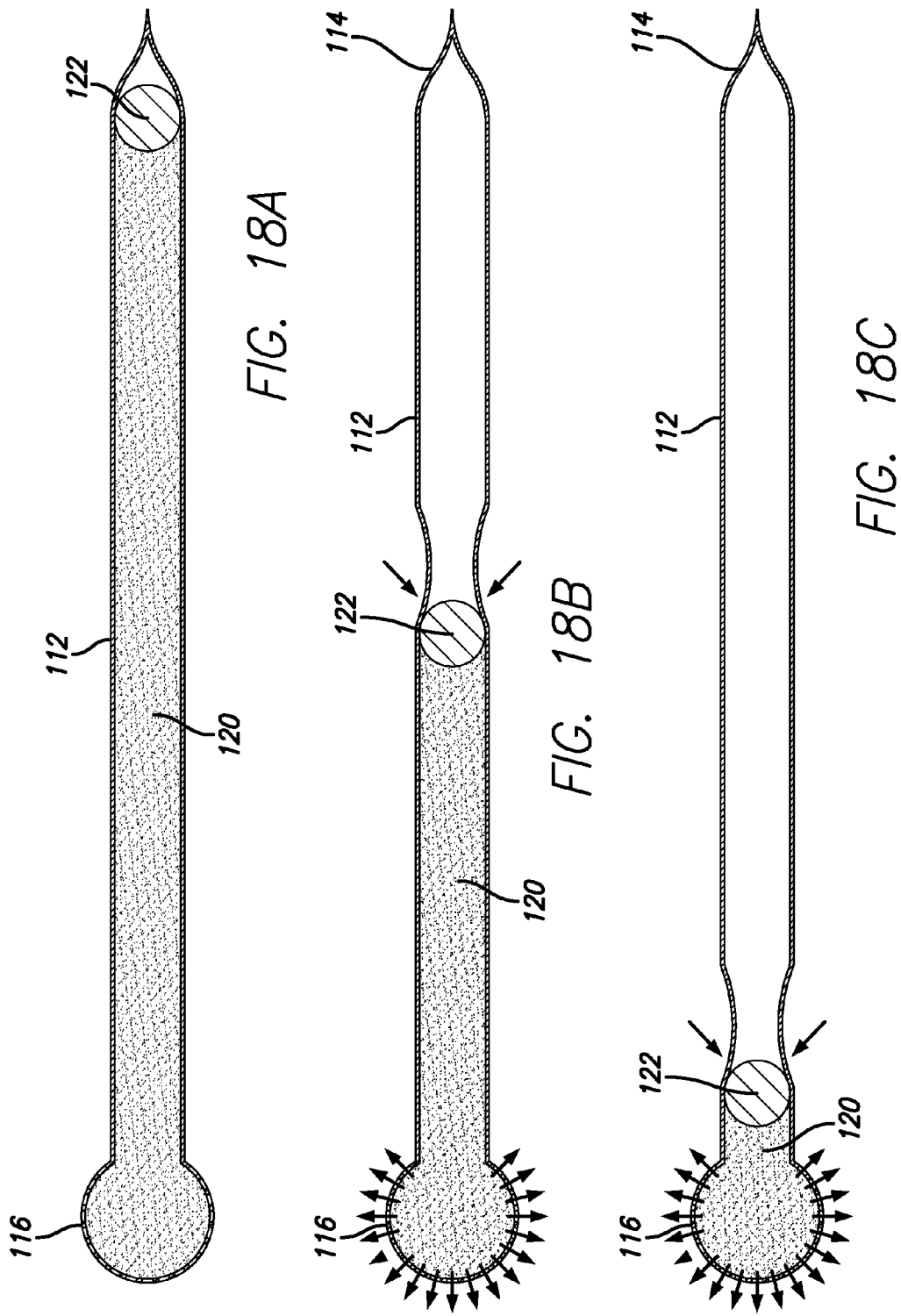

CONFECTIONARY PRODUCT AND METHOD OF MANUFACTURE AND USE

RELATED APPLICATION

The present application claims the benefit of U.S. provisional pat. App. Ser. No. 61/290,634, filed Dec. 29, 2009, the contents of which are incorporated herein by reference in their entirety.

BACKGROUND

1. Field of the Invention

The present invention relates generally to confectionary products and is particularly concerned with such products in which a flowable confection is dispensed and methods of manufacturing and using such products.

2. Related Art

Snack foods such as popcorn, chips, nuts, and the like are generally eaten with the fingers, which is the only practical way to consume such foods due to their nature. One problem with this technique is that oil and seasoning applied to the outside of the snack food adheres to the eater's fingers, making them sticky and messy. This is inconvenient in a movie theater or the like, where there is no convenient means for cleaning the fingers without leaving the theater.

Candy or confectionary products in which a flowable confection is dispensed from a container are known, but such products are generally relatively complex and expensive to manufacture, and include a relatively large and cumbersome, non-edible container.

SUMMARY

Embodiments described herein provide for a confectionary product in which a flowable, sticky confection is dispensed, which can optionally be used to assist in eating snack foods such as popcorn, chips, nuts, and similar snack foods of the type which are in small pieces and are often coated with flavorings, oils and the like.

According to one embodiment, a confectionary product comprises a pliable tube filled with a flowable, sticky confection and having opposite first and second ends, an enlarged head secured to the first end of the tube and the second end being closed to hold the sticky confection in the tube. The head has one or more dispensing openings and a passageway extending through the head to the opening or openings which communicates with the tube, whereby the wall of the tube can be squeezed to force the flowable confection through the head and out through the openings.

In one embodiment, the head is made of a hard candy material and may be ball-shaped. In one embodiment, the head is a generally solid ball of candy apart from a passageway or channel which extends through the ball from an inlet which communicates with the interior of the tube and a dispensing opening on an opposite surface portion of the head. The first end of the tube may be embedded within the candy head during manufacture, with the hard candy material of the head extending through openings in the tube wall adjacent the first end to secure the tube to the head. In this embodiment, the hard candy head of the product can be consumed after the flowable confection has been dispensed.

In another embodiment, the head may be hollow to provide the passageway, and may be of edible or non-edible material such as plastic. In this case, the head has a plurality of separate holes or openings extending over at least a major portion of its surface for dispensing confection out of the head. The product may be designed for a single use or may be re-filled after use.

The pliable tube of the above embodiments may be a conventional, large size straw which is sealed at one end. By squeezing the walls of the tube, the flowable confection material is forced into the dispensing head and out through the single opening or the perforations or holes in the head. If this is done while the head is touching a quantity of a snack food such as popcorn, the loose pieces of popcorn become adhered to the sticky confection material and can be carried on the head to the user's mouth.

The dispensing head may be dome-shaped, hemispherical, spherical or any other suitable rounded shape. In one embodiment, the head is hollow and has perforations extending over all or part of its surface. In another embodiment, the head may be a substantially solid, candy head and has a single, enlarged opening communicating with the tube via a passageway extending through the solid head. The opening may be of any desired shape and in one embodiment is a star shape which has a center substantially aligned with the central longitudinal axis of the tube, and extends over substantially half of the outer surface of the head. The passageway tapers outward from the inlet opening to the outer end of each point of the star on the outer surface of the head, forming separate channels or grooves through the candy head extending up to the respective points of the star-shaped opening.

The flowable confection may be of any sticky, viscous food product or confectionary paste, and may contain sugar or artificial sugar as well as flavoring, color agents and flow agents. In one embodiment, the confectionary material is marshmallow fluff.

The entire assembly holds the sticky confection and this confection permeates through the head as the confection is pushed or squeezed from the sealed, second end towards the first end of the tube. The user/consumer dispenses the confection by squeezing the dispensing tube which pushes the confection through the tube and out of the head for consumption. In use, the user squeezes the tube/straw from the closed, second end to the first end. The user may then consume the extruded confection directly, or place the sticky end in contact with a loose snack food such as chips, popcorn, or the like, causing the snack food to stick to the head of the product. The user continues to push confection to the surface of the head as needed until consumption is complete.

In one embodiment of a method of manufacturing a confectionary product, a first end of a straw or pliable tube is inserted through an opening in a mold and into a mold cavity containing a molten hard candy mixture so that some of the candy mixture extends into the straw and a passageway or channel-forming mold portion of the cavity extends through the end of the straw and out of the molten candy mixture to form an opening through the candy when hardened. The molten hard candy is then allowed to cure and harden. The straw is then filled with a flowable confection through the second end of the straw, the straw and attached hardened candy head are removed from the mold, and the second, free end of the straw is crimped and sealed shut.

The confectionary product described above is simple and inexpensive to manufacture, and allows a flowable confection to be dispensed readily through one or more openings in a head for consumption or use in adhering potentially messy snack foods such as popcorn to the head to be eaten easily without using one's hands. Where the head is made of hard candy, both the flowable confection and the hard candy head can be consumed, after which the straw is simply discarded. The flowable confection may be supplied in many different flavors and colors, as can the hard candy head. When used to pick up a loose snack food, consumers can apply as much confection, taste or flavor to the snack food as desired by simply pushing more confection to the surface of the head. By filling the product or device with different flavors of flowable confection, five consumers can get five different flavors out of one bag of popcorn, for example.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which:

FIG. 3 is a top plan view of the head of the confectionary product of FIGS. 1 and 2;

FIG. 4 is a bottom plan view of the confectionary product of FIGS. 1 to 3;

FIG. 5 is a side elevation view of the confectionary product of FIGS. 1 to 4, taken from the left hand side of the product as viewed in FIG. 4;

FIG. 6 is another side elevation view of the confectionary product of FIGS. 1 to 5, taken in the direction of arrow A in FIG. 4;

FIG. 10 is a side elevation view of the mold parts of FIGS. 9A and 9B prior to closing the mold;

FIG. 11 is a cross-sectional view through the mold taken along the line 11-11 of FIG. 10 prior to the filling of the mold cavity with molten hard candy material;

FIG. 12 is a view of one end of the straw prior to insertion in the mold cavity;

FIG. 16 is a side elevation view of a second embodiment of a confectionary product;

FIG. 17 is a cross-sectional view on the lines 17-17 of FIG. 16;

FIG. 18A is a cross sectional view of the product of FIGS. 16 and 17 at a first stage of the dispensing process;

FIG. 18B is a view similar to FIG. 18A but with the plunger ball pushed part of the way up the tube to dispense flowable confection material out of the openings in the head;

FIG. 18C is a view similar to FIG. 18B but illustrating a subsequent stage of the process when the tube is nearly empty;

DETAILED DESCRIPTION

Certain embodiments as disclosed herein provide for a confectionary product or confectionary dispensing product. In some embodiments, the product allows snack foods which are in small pieces, such as popcorn, nuts, chips and the like, to be eaten without using the fingers.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention.

Figure 14:
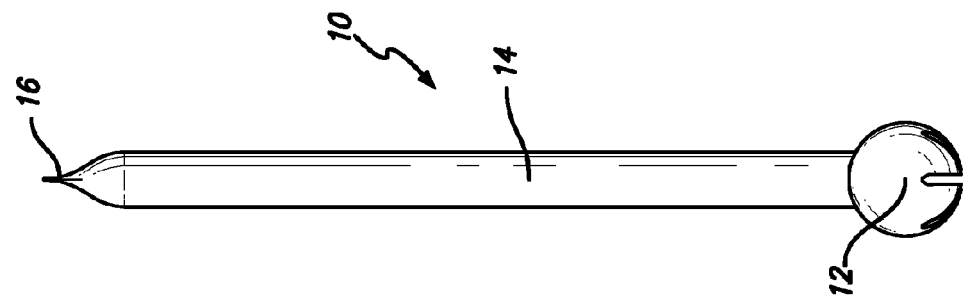
FIG. 14 illustrates a final step in the method in which the open end of the filled straw is crimped or sealed.
Figure 15A:
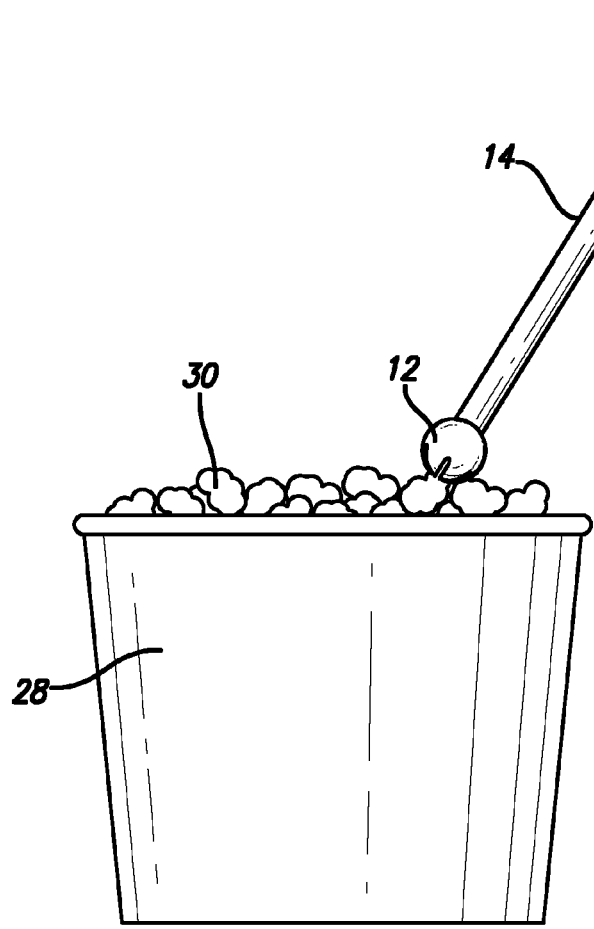
FIGS. 15A and 15B are schematic views illustrating a method of using of the device to eat popcorn or other snack foods.
Figure 15B:
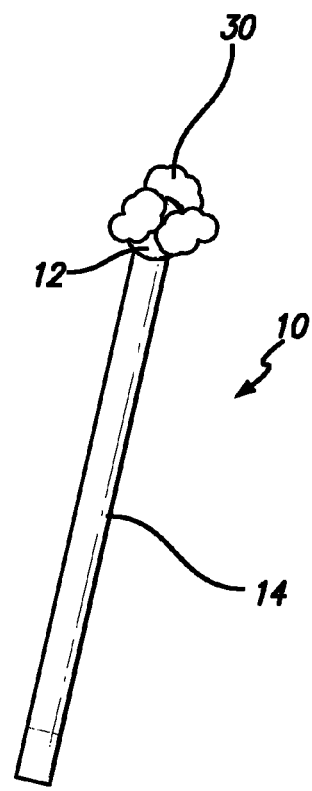

FIGS. 1 to 8 illustrate a first embodiment of a confectionary product 10 while FIGS. 9A to 14 illustrate a method of manufacturing the product and FIGS. 15A and 15B illustrate an optional method of using the product. Confectionary product 10 comprises two parts, specifically a hard candy head 12 which may be ball-shaped as illustrated or of other rounded shapes, and a pliable tube or straw 14 which has opposite first and second ends 17, 16. The first end 17 is embedded in the candy head 12. The straw is filled with a flowable, sticky confection material 15 and the second end 16 is sealed so as to contain the material 15 within the straw. The sticky confection material 15 may be a sticky, viscous sugar-based food or confectionary paste of a flowable icing-like consistency, and may contain sugar or artificial sugar as well as flavoring, color agents, and flow agents. The flowable confection material 15 may comprise marshmallow fluff or marshmallow crème in one embodiment. In alternative embodiments, the sticky, viscous and flowable confection material may comprise jelly, caramel, fondant, confectionary paste, icing or the like. The head is made of any suitable hard sugar candy material as is generally known in the field of hard candies, and may be of various colors and flavors, or may be multi-colored.

Figure 1:
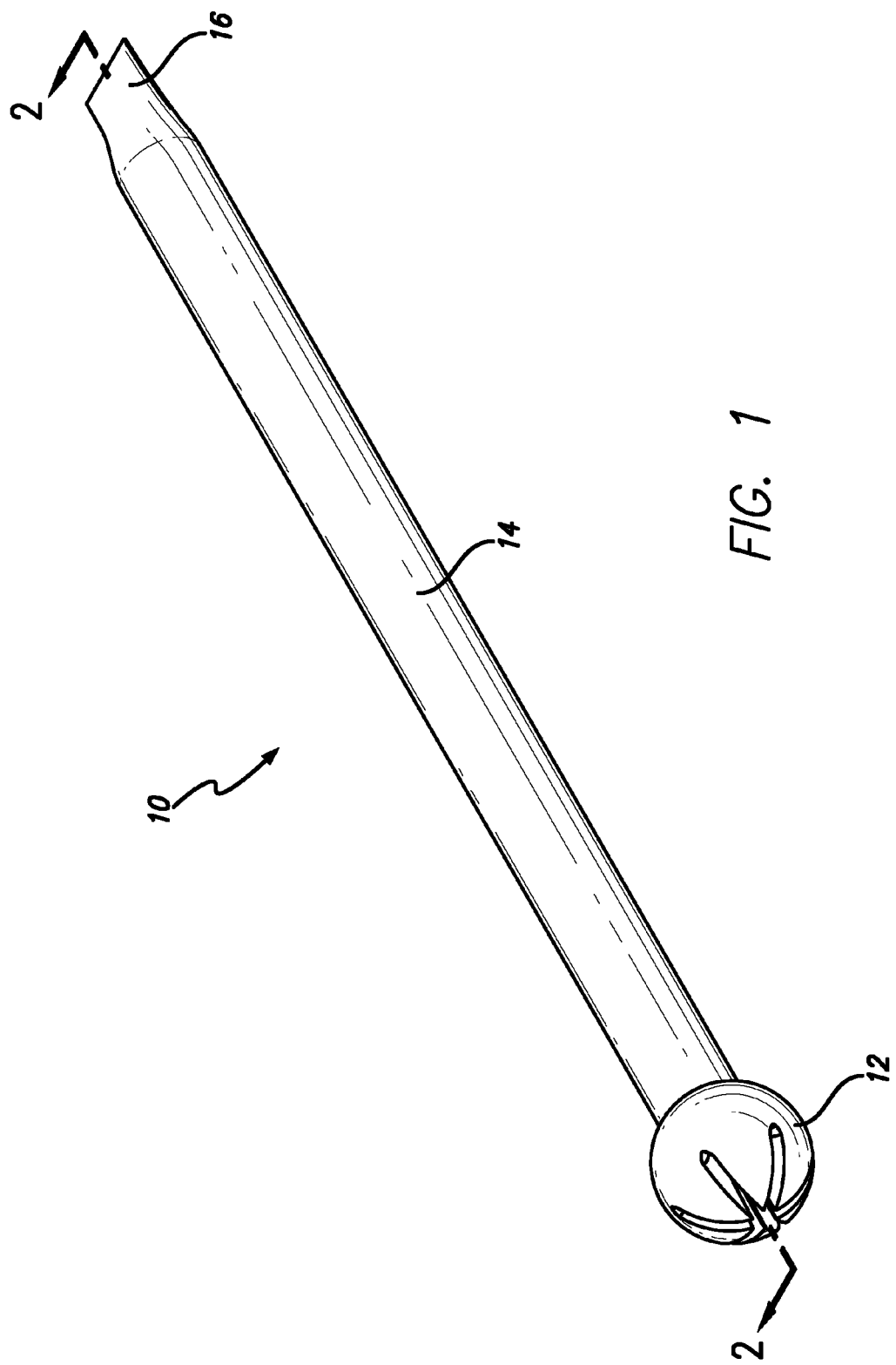
FIG. 1 is a perspective view of a first embodiment of a confectionary product.
Figure 2:
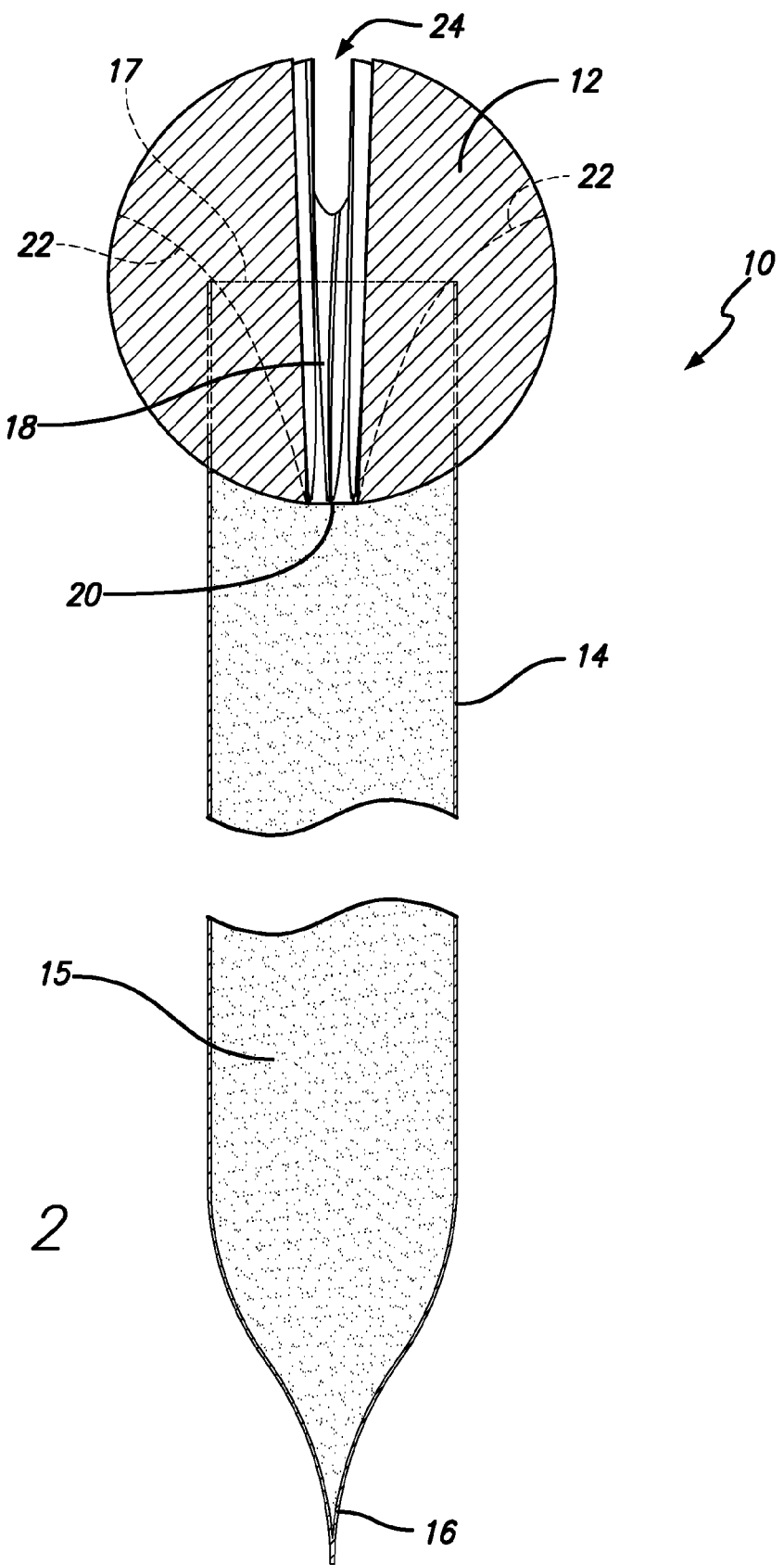
FIG. 2 is a cross-sectional view on the lines 2-2 of FIG. 1.
Figure 7A:
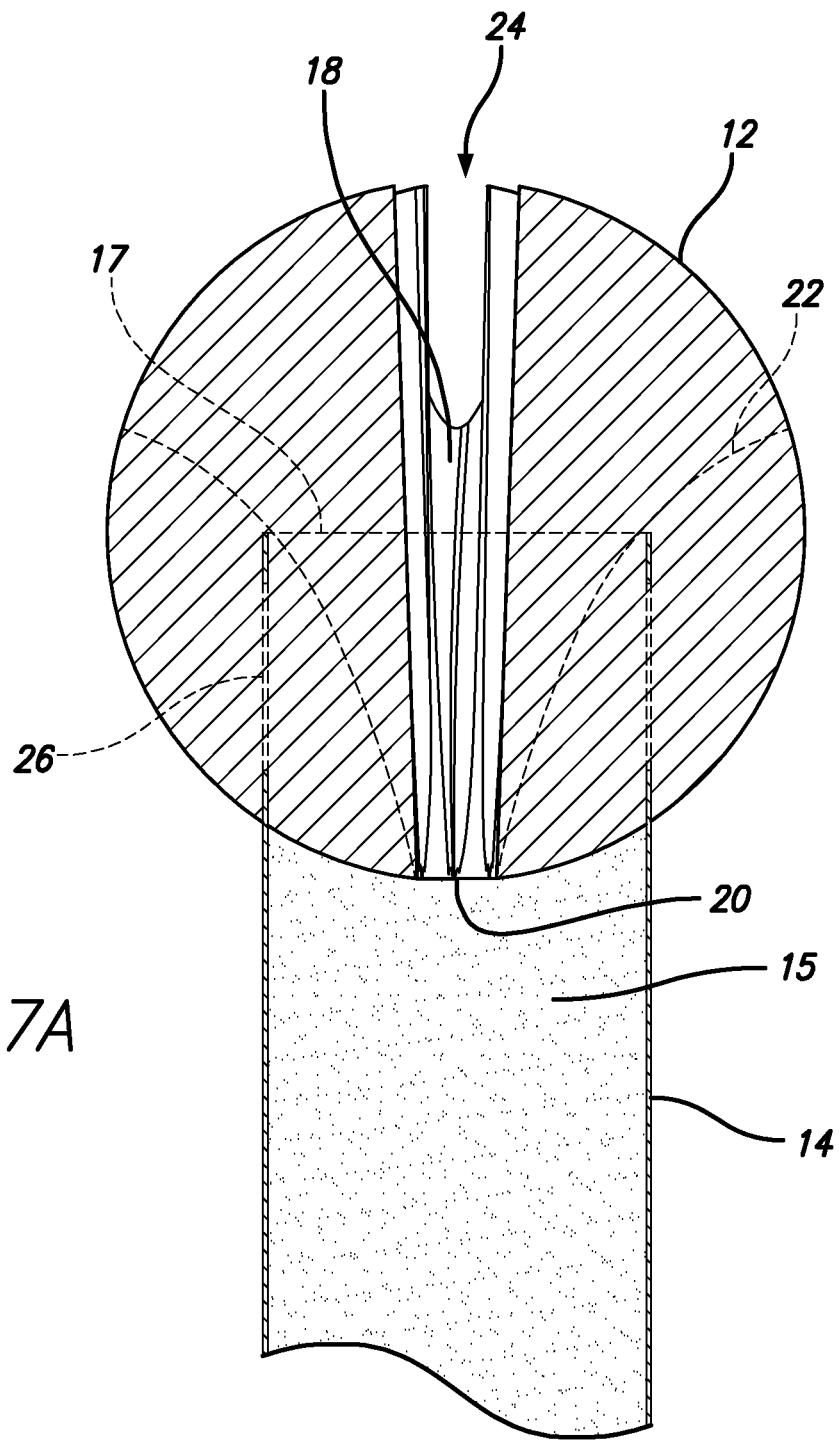
FIG. 7A is a cross-sectional view of the product on the lines 7A-7A of FIG. 3.
Figure 7B:
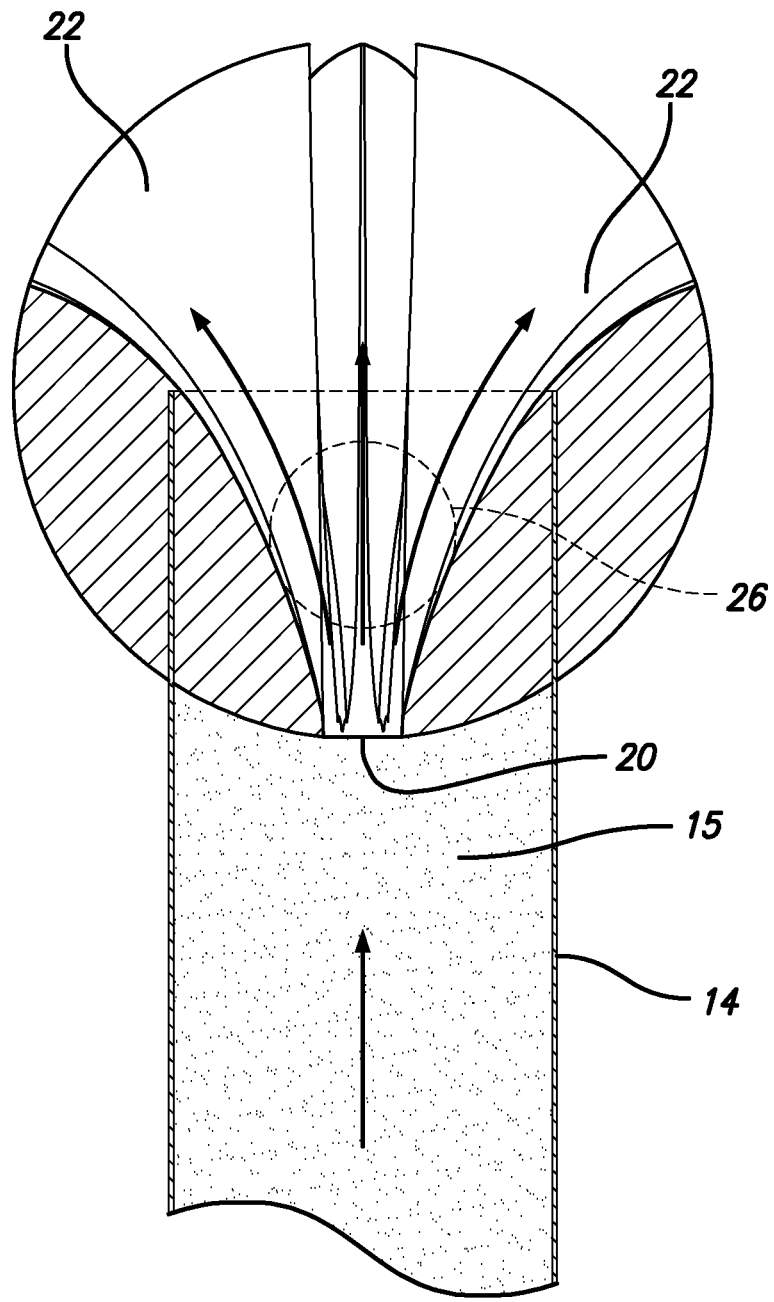
FIG. 7B is a cross-sectional view of the product on the lines 7B-7B of FIG. 3.

As illustrated in FIGS. 2, 3, 7A and 7B, the head 12 has a central passageway 18 which has a central portion which is aligned with the central axis of the straw and which expands out from a circular inlet opening 20 on one side of the head into generally star shaped, outwardly tapering channels 22 which have inner ends contiguous with the central portion of the passageway as seen in FIGS. 1, 3, and 7B. The passageway and channels terminate in a single, generally star-shaped dispensing opening 24 which has a center on the opposite or outer side of the head aligned with the inlet opening 20 and a plurality of slot-like portions or lobes 25 extending outwardly from the center. Thus, the opening in the head when viewed from above is a star shape with six points or lobes 25 which extend around half of the periphery of the head. Alternatively, a pattern with a greater or lesser number of lobes or points may be used. Openings of many different shapes may be used in alternative embodiments, such as other multi-lobed patterns, including flower shapes with rounded, oval, or other shaped lobes, trefoil shapes, and the like, by appropriate shaping of the mold used to make the head, as described in more detail below in connection with FIGS. 9 to 14. The solid head with an outwardly tapering passageway extending up to a lobed or star shaped dispensing opening, with separate channels or grooves extending up to each lobe or point of the star, as in the illustrated embodiment, produces relatively high strength and reduces the risk of the head breaking or shattering prior to consumption of the product.

The flexible tube or straw 14 may be a standard large straw, such as a so-called "bubble tea" straw of about ½ inch diameter. Openings 26 are formed around the periphery of the straw adjacent the first end, as best illustrated in FIG. 12 which illustrates the end of the straw prior to attachment to the hard candy head. In one embodiment, the head or ball end 12 may be of approximately ¾ inch diameter, but the head may be of larger size in alternative embodiments. The product may be around 200 mm. in length.

Figure 8:
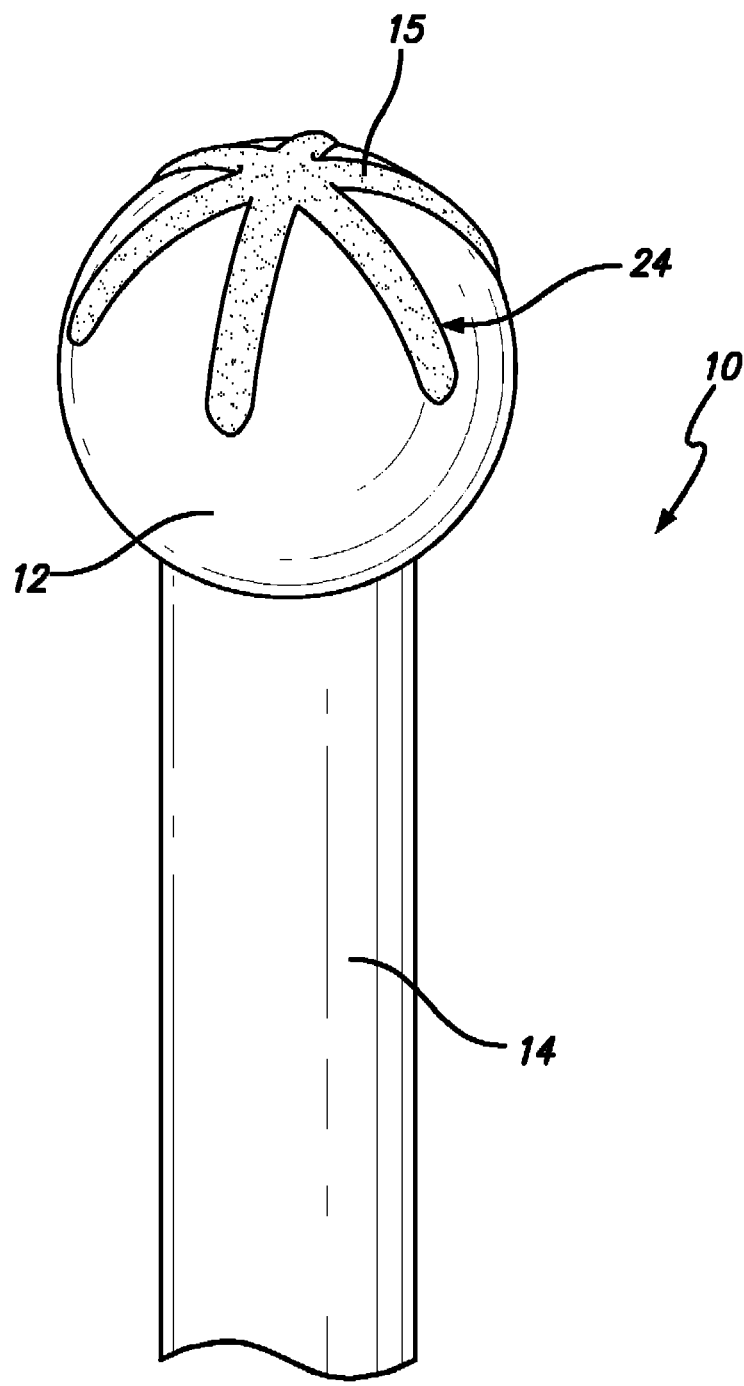
FIG. 8 is an enlarged perspective view of the head of the confectionary product after some of the flowable confection has been squeezed out through the star shaped channel in the hard candy head.

The flowable confection material 15 can be dispensed through the candy head 12 by squeezing the straw 14 to squeeze material up the straw in a similar manner to a toothpaste tube or the like, pushing material 15 up through inlet opening 20 and into the head, and eventually through the head and out through the upper opening in the head, in the direction of the arrows in FIG. 7B. The flowable material fills the passageway and channels 22 as the tube or straw is squeezed, and is eventually forced out through the star-shaped opening 24 onto the outer surface of the head, as illustrated in FIG. 8. The extruded flowable sticky confection or sugar fluff 15 can then simply be consumed, after which the candy head can also be consumed. The straw 14 is then discarded. Alternatively, a consumer may choose to use the product or device 10 as a utensil to consume snack foods which are in small pieces, such as popcorn, nuts, chips and the like, without using the fingers, as illustrated in FIGS. 15A and 15B. For example, where the product 10 is used to eat popcorn, the user first forces confection material 15 through the head so that it extrudes out of opening 24, as indicated in FIG. 8. The user then immerses the head into a tub 28 of popcorn 30, as illustrated in FIG. 15A. The external sugar fluff or sticky confection material causes starchy snacks such as popcorn to stick to the head 12, as illustrated in FIG. 15B, and the user can then eat the adhered popcorn from the head. The user continues to push confection to the surface of the candy head 12 as needed until consumption of the popcorn is complete. This allows the user to eat popcorn or other starchy snacks without using their hands, avoiding problems of messy, sticky fingers soiling clothing, and also reducing the amount of snack food falling on the floor during eating.

Figure 9A:
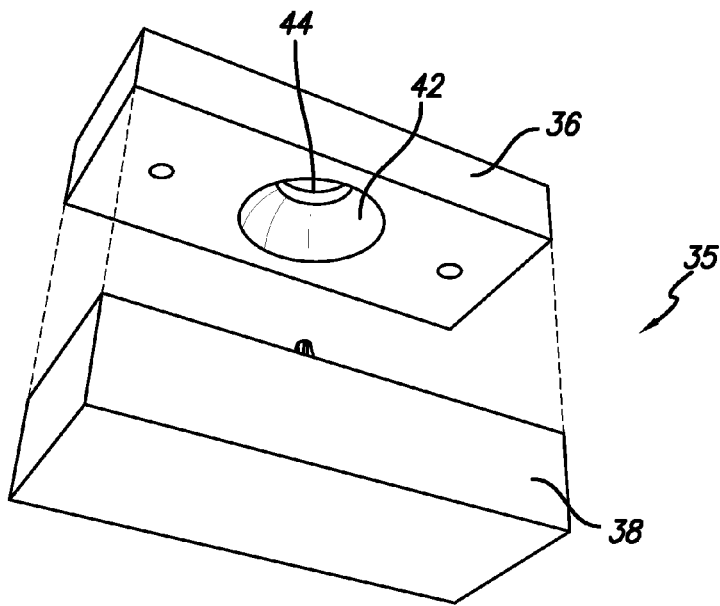
FIG. 9A is an exploded, bottom perspective view of the mold parts of one embodiment of a mold for making the confectionary product of FIGS. 1 to 8.
Figure 9B:
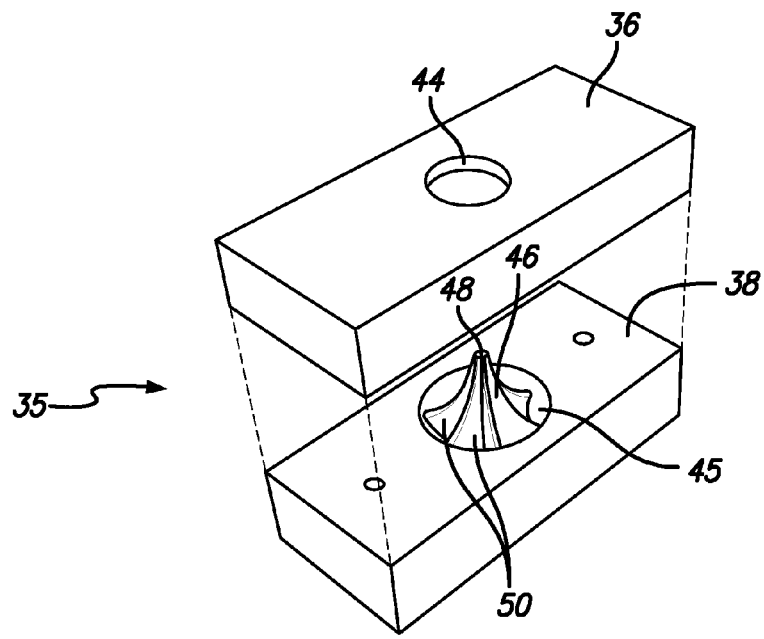
FIG. 9B is an exploded, top perspective view of the mold parts of FIG. 9A.

FIGS. 9A to 11 illustrate one embodiment of a two part mold 35 which may be used to manufacture confectionary product 10. A multi-cavity mold may be produced in a similar manner to manufacture multiple products 10 simultaneously, but a single cavity is illustrated in the drawings for convenience. As illustrated in FIGS. 9A and 9B, the mold comprises first and second mold parts 36, 38 which have opposing faces defining a mold cavity 40 when the mold is closed as in FIG. 11. A first part 42 of the mold cavity in first mold part 36 comprises a substantially hemispherical cavity, and a circular opening 44 of diameter similar to that of straw 14 in the outer face of part 42 communicates with the cavity. The second part 45 of the mold cavity is located in mold part 38 in alignment with part 42, and is also of hemispherical shape with a pattern or protrusion 46 which protrudes from part 45 into part 42 up to opening 44 when the mold is closed. Pattern or protrusion 46 is designed to form the through bore 18 through the candy head in addition to the outwardly tapering channels or grooves which terminate in the star-shaped opening 24. Thus, protrusion 46 has a central boss 48 and outwardly extending flanges or wings 50 which taper outwardly from the tip of boss 48 to meet the hemispherical surface of the mold part 45, as best illustrated in FIGS. 9B and 10.

Figure 13B:
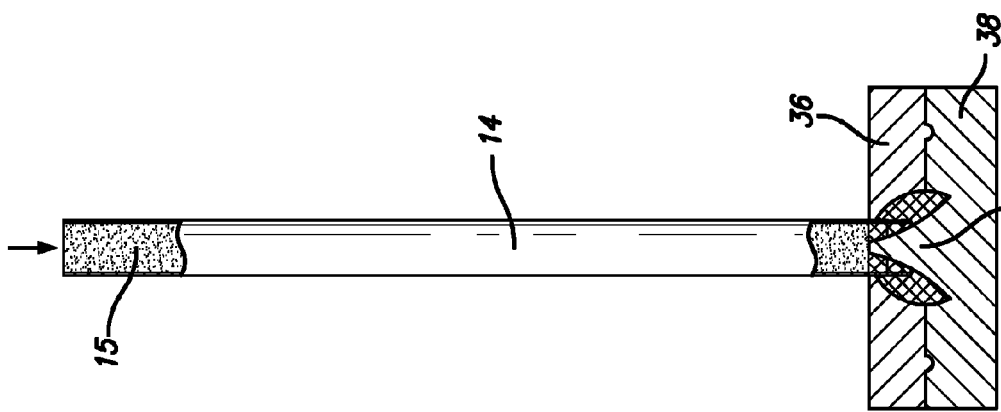
FIG. 13B illustrates the next step in the method in which the molten candy material in the cavity has hardened and the straw is filled with a flowable, sticky confection.
Figure 13A:
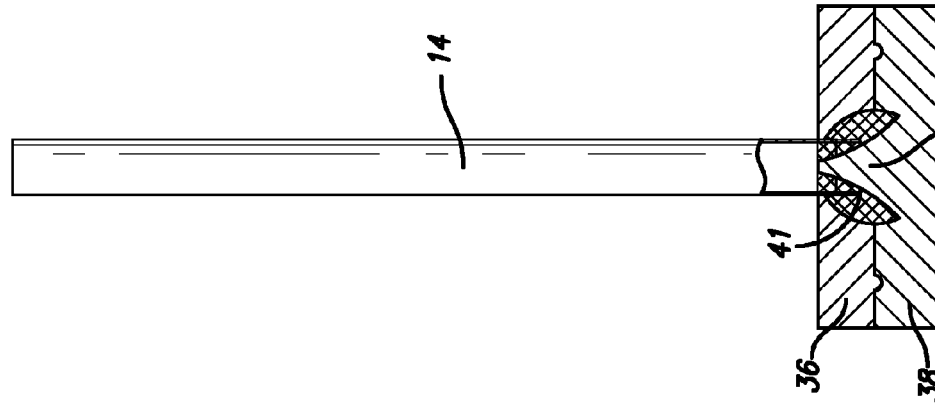
FIG. 13A illustrates a step in making the product in which the perforated end of the straw is inserted into the molten hard candy material after the cavity is filled.

When the two parts of the mold are secured together as in FIG. 11, molten or flowing hard candy material 41 is supplied to cavity 40 through opening 44 as indicated by the arrow. The candy material flows around protrusion 46 to fill the cavity. The first end 17 of the straw 14 is then inserted into the molten hard candy material through opening 44 and over the narrower end portion of protrusion 46, as indicated in FIG. 13A. As indicated in FIG. 12, a series of holes 26 are provided around an end portion of the straw adjacent end 17 and are also located in the molten candy material in mold cavity 40 when the straw is fully inserted, as in FIG. 13A. Candy material flows through the holes into the straw and surrounds the portion of shaped protrusion or pattern member 46 which extends through the straw. As the candy material is allowed to cure, it also cures around the holes 26, which locks the straw to the candy ball. After the ball head 12 has hardened, the straw is filled with flowable confection material through the open end of the straw, as illustrated in FIG. 13B. The mold parts are then removed and the end 16 of the straw is crimped or heat sealed (FIG. 14).

The confectionary product described above is simple and inexpensive to manufacture, and can be made in numerous different flavor combinations, including both sweet and savory flowable confectionary materials and different flavors and colors of the candy head 12 which is also designed to be consumed after all or substantially all of the flowable material is dispensed from tube 14. It is also attractive in appearance, due to the star shaped outlet opening molded into the candy head. As noted above, the outlet opening may be designed in alternative attractive shapes in other embodiments. The consumer may choose simply to eat all of the edible parts of the device, or may use the device as a utensil to pick up and eat loose snack food pieces without using their fingers, for example as illustrated in FIGS. 15A and 15B for popcorn.

FIGS. 16 to 18C illustrate a confectionary product or dispensing device 110 according to a second embodiment. Unlike the previous embodiment, device 110 has a hollow head 116 rather than a substantially solid head 12. As best illustrated in FIGS. 16 and 17, device 110 basically comprises a flexible tube 112 which is open at first end 115 and sealed shut at second end 114 by heat welding or the like, and a hollow dispensing head 116 having a plurality of perforations or openings 118 secured to the first end of the tube. As in the previous embodiment, the tube may be a standard, large diameter drinking straw such as a ½ inch diameter "bubble tea" straw. The tube 112 is filled with a flowable, sticky confection material 120, and in one embodiment an internal free floating ball 122, which may be of plastic material or the like, is located within the tube. The ball 122 is initially located close to the sealed end 114 of the tube, and has a diameter close to the inner diameter of the tube. In one embodiment, the device may be of the order of 200 mm in length. The ball is of slightly smaller diameter so as to be movable freely along the tube.

The dispensing head 116 may be of edible candy material, as in the previous embodiment, or may be of plastic material or the like, and is of spherical or part-spherical shape. In alternative embodiments, head 116 may be dome-shaped, hemispherical, or of other part spherical or rounded shapes. As in the previous embodiment, the sticky confection material 120 may be a sticky, viscous sugar-based food or confectionary paste of a flowable icing-like consistency, and may contain sugar or artificial sugar as well as flavoring, color agents, and flow agents. The flowable confection material 20 may comprise marshmallow fluff or marshmallow crème in one embodiment. In alternative embodiments, the sticky, viscous and flowable confection material may comprise jelly, caramel, fondant, confectionary paste, icing or the like.

As in the previous embodiment, the device 110 may be used for eating a snack food such as popcorn, chips, nuts, and similar snack foods of the type which are in small pieces, in the same manner as illustrated in FIGS. 15A and 15B for confectionary device 10. When a user wishes to dispense flowable confectionary material 120 from the device, they start to squeeze and push the ball 122 up the tube with their fingers, as illustrated in FIGS. 18B and 18C. This forces some of the material 120 into the hollow interior of the head and out of the openings 118. Once some of the material 120 has been forced out of the openings onto the surface of head 116, the user immerses the resultant sticky end of the head into the snack food. This causes the snack food, such as popcorn or the like, to stick to the head 116, and the user can then eat the adhered popcorn from the spherical or hemispherical perforated eating surface. The user continues to push confection to the surface of the head 116 as needed until consumption of the popcorn is complete.

Consumers can engage the popcorn with as much confection as is desired. For example, the popcorn can be consumed using the utensil with minimal transfer of confection onto the popcorn. Alternatively, the user can apply more pressure and squeeze more confection out of the tube onto the head to apply more confection to the popcorn, or even lick the head of the device to consume only the sugary confection if desired.

The ball facilitates pushing of all the material out of the tube and also avoids suck back of confection material into the body of the tube when pressure on the tube is released. The confection material provides lubrication for the ball 122 to allow it to move easily within the tube when pushed by a user's fingers on the outside of the tube. In an alternative, simpler embodiment, the ball 122 may be omitted and the user can then squeeze material out of the tube in a similar manner to a toothpaste tube or the like, as in the previous embodiment.

Figure 19:
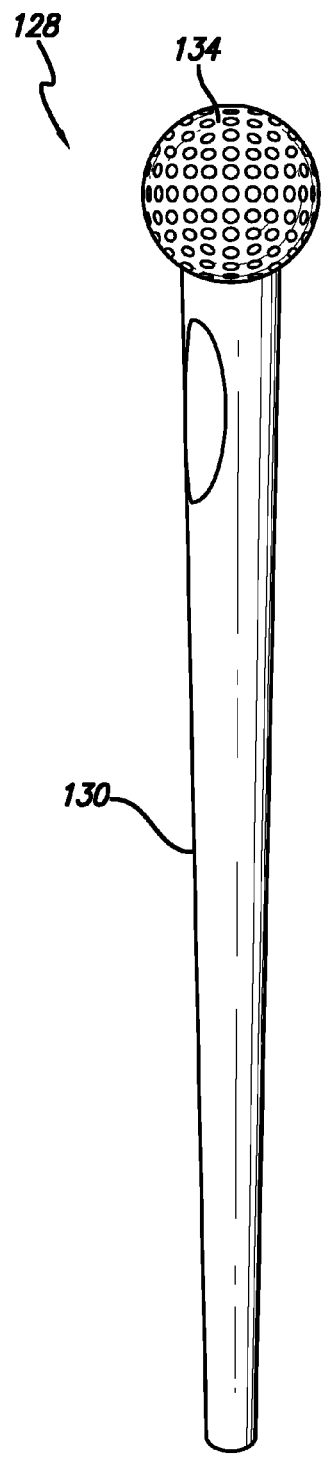
FIG. 19 is a side elevation view illustrating a third embodiment of a confectionary or candy product.
Figure 20:
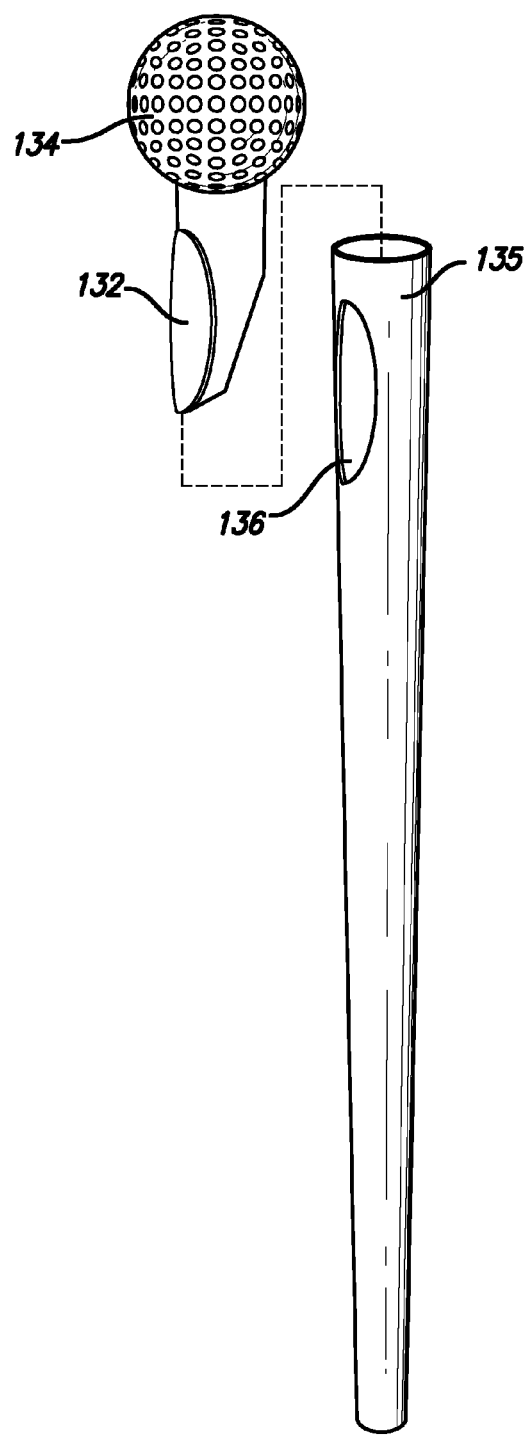
FIG. 20 is a side elevation view illustrating the two parts of the product of FIG. 19 separated.
Figure 21:
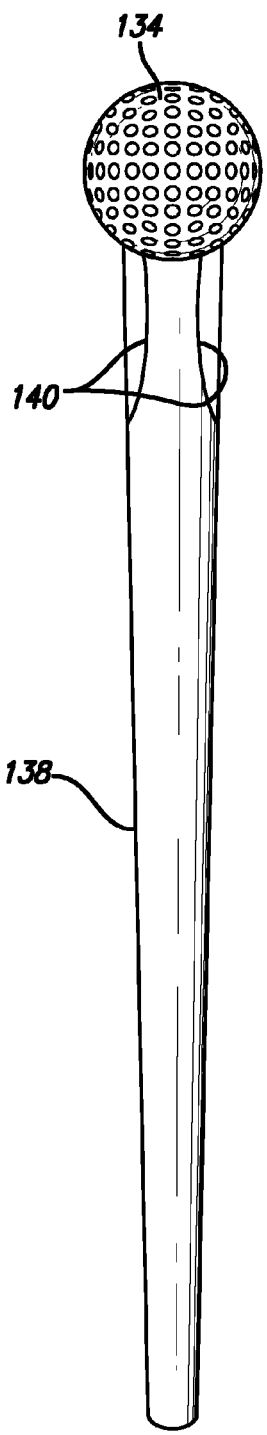
FIG. 21 is a side elevation view illustrating a modified version of the confectionary product or candy dispenser of FIGS. 19 and 20.
Figure 22:
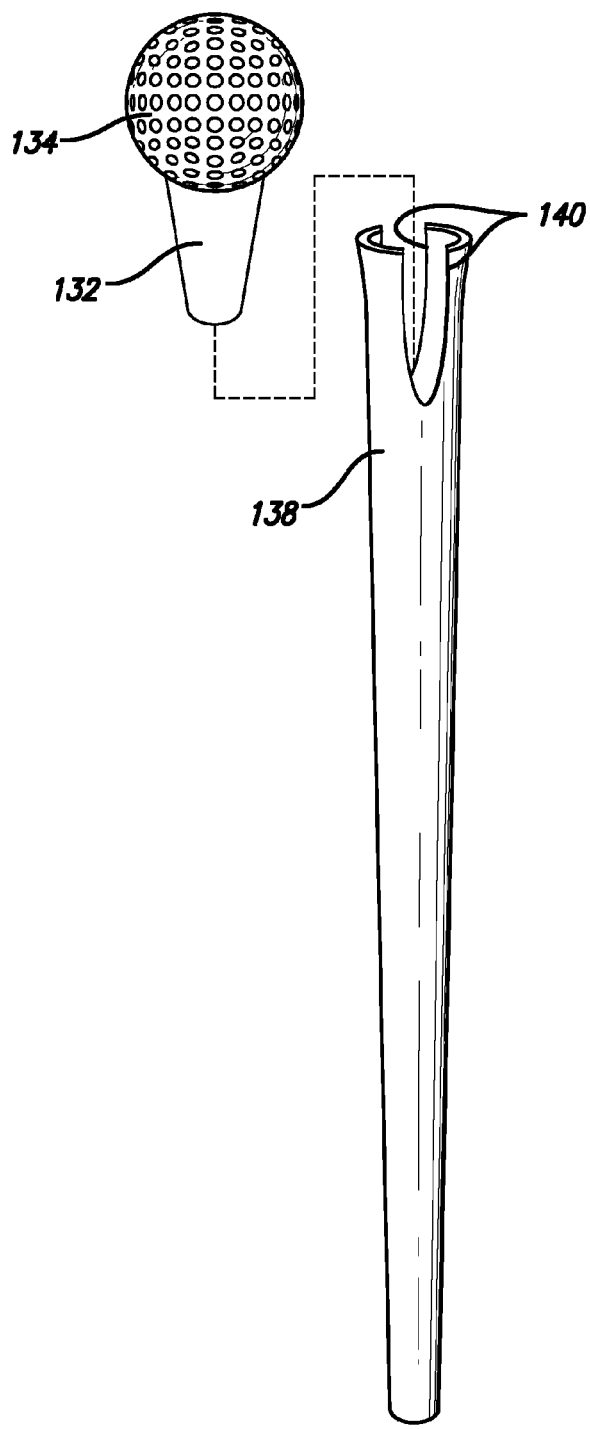
FIG. 22 is a side elevation view illustrating the two parts of the product of FIG. 21 separated.

In the embodiment of FIGS. 16 to 18C, the utensil is designed for one time use and is disposed of after all the confection material is dispensed. FIGS. 19 and 20 illustrate a third embodiment of a confectionary product 128 which is a dispensing device similar to that of FIGS. 16 to 18C but with the option of re-placing an empty container or cartridge of flowable confection material after use if desired. Alternatively, the device may be discarded after use. Device 128 comprises a re-usable, elongate plastic handle 130 and a replaceable cartridge which comprises a squeezable confection dispensing tube 132 with a domed dispensing end or head 134. The handle 130 has a relatively narrow gripping end portion, and diverges outwardly to a hollow end portion 135 in which the dispensing tube 132 is removably received. As in the previous embodiment, dispensing tube 132 is filled with a flowable, sticky confection material. End portion 135 has an opening or slot 136 through which a user can squeeze the wall of tube 132 in order to dispense confection material out of the perforations in head 134, in the same way as in the previous embodiment. In the alternative embodiment of FIGS. 21 and 22, a modified handle 138 has two opposing slots or cut-outs 140 so that a user can squeeze opposite portions of tube 132. This embodiment is otherwise identical to the embodiment of FIGS. 19 and 20, and like reference numbers are used for like parts as appropriate. In the embodiment of FIGS. 21 and 22, the dispensing tube 132 is designed to install axially into the open end of handle 130 and snap into place, and can be removed and replaced when empty. The dispensing tube in the embodiments of FIGS. 19 to 22 may be of a food-safe, pliable poly-foil laminate material or the like, and may be made from recyclable or recycled materials.

The confectionary product in the above embodiments is simple and inexpensive to manufacture. The product of FIGS. 1 to 15 has a hard candy head through which flowable confectionary material is dispensed, so that the head can be consumed after all the flowable confection is dispensed, leaving only the empty straw to be discarded. The products of FIGS. 16 to 22 have hollow, perforated plastic heads and are designed to dispense flowable confectionary material only, with no other edible parts. In each of the embodiments described above, a consumer may simply eat the edible portion or portions of the device. Alternatively, any of the devices described above may be used to aid in eating messy or sticky snack foods without the hands coming into contact with the food. This provides a more sanitary way to share foods such as popcorn. Any popcorn which comes into contact with the head of the device is removed from the popcorn or other snack food container, so another person is unlikely to eat popcorn which is potentially contaminated by saliva or the like. The above devices can be filled with confection material in a number of different flavors and types, and the user can apply as much confection, taste or flavor to the food or popcorn as desired, by selecting how much of the confection to squeeze out onto the surface of the head before dipping it in the food.

The tube may be filled with confection material of any desired flavor, and different flavors and colors of confection material may be used in different products, allowing the consumer to select between a variety of different confectionary products. The hard candy head of the first embodiment may also be provided in different flavors and colors in different products, so as to provide a wide variety of different color and flavor combinations. This device allows popcorn or other snack foods to be eaten without the eater's fingers coming into direct contact with the snack food, avoiding transfer of oils and other sticky materials onto the fingers. This arrangement is also more hygienic when several people share a container of a snack food such as popcorn, and reduces the amount of snack food dropped onto the floor or the consumer's clothing.

Popcorn, being a high starch food item, exhibits some unique behavior when in contact with the human tongue or with certain sugar-based substances. Starch is a polysaccharide carbohydrate. The starch molecule consists of a large number of glucose units joined together by glucosidic bonds. Amylase, an enzyme in human saliva, quickly breaks down starch into sugar. This hydrolysis process breaks down the starch molecule at these glucosidic bonds into shorter sugar molecules and also creates, or migrates, hydrogen bonds in the process. So popcorn quickly attaches (sticks) to the tongue with the slightest contact. A similar process takes place when certain sticky sugar confections come in contact with the starchy popcorn. The hydrogen bonds are what make it stick. The confectionary product described herein leverages this starch/sugar relationship and provides a novel way and means to eat popcorn without using ones hands and while keeping the popcorn from falling onto the eater or onto the floor, as is frequently the case with finger eating.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

I claim:

1. A confectionary product comprising:
a hollow, pliable tube having opposite first and second ends, an interior, and an outer surface, the tube containing a flowable confectionary material and the second end being sealed to contain the confectionary material;
a rounded shaped head made of hard candy material, wherein the head is secured to the first end of the tube; the head having an outer surface; the head having a diameter that is larger than a diameter of the tube;
the head having a passageway which extends from a first end on the outer surface of the head, to a second end on the outer surface of the head; a first end of the passageway comprising an inlet opening that is positioned within the tube, the inlet opening is also at the first end on the outer surface of the head, and a second end of the passageway comprising a single dispensing opening, the single dispensing opening is also at the second end on the outer surface of the head, and the outer surface of the head having no openings apart from the inlet opening and the single dispensing opening; and the tube having a wall that is squeezable whereby the flowable confectionary material can be urged through the passageway in the head and out through the dispensing opening,
and wherein the tube does not extend to the second end on the outer surface of the head;
wherein the single dispensing opening has a center opposite with the inlet opening; the single dispensing opening also having multiple lobes extending outward from the center; the multiple lobes having outer ends, and the passageway through the head has a central portion extending to the center of the dispensing opening, and wherein the passageway through the head tapers outwardly from the inlet opening to the single dispensing opening, extending to the outer ends of each of the multiple lobes to form multiple separate channels; and wherein the multiple lobes extend beyond the diameter of the tube.

2. The product of claim 1, wherein the lobes of the dispensing opening extend from the center of the dispensing opening outwardly over at least half of the outer surface of the head.

3. The product of claim 1, wherein a shape of the dispensing opening is selected from the group consisting of a star shape, flower shape, and trefoil shape.

4. The product of claim 1, wherein the tube comprises a drinking straw.

5. The product of claim 4, wherein the straw has a diameter of approximately 0.5 inches.

6. The product of claim 5, wherein the head is ball-shaped and has a diameter of at least 0.75 inches.

7. The product of claim 1, wherein the flowable confectionary material is selected from the group consisting of marshmallow fluff, marshmallow crème, jelly, caramel, fondant, confectionary paste, and icing.

* * * * *